United States Patent [19]
Paton

[11] 3,945,783
[45] Mar. 23, 1976

[54] FIBRE REINFORCED COMPOSITES

[75] Inventor: William Paton, Eaglesham, Scotland

[73] Assignee: National Research Development Corporation, London, England

[22] Filed: Apr. 5, 1974

[21] Appl. No.: 458,431

[52] U.S. Cl. ............. 425/122; 425/115; 425/363
[51] Int. Cl.[2] .......................................... B29D 23/00
[58] Field of Search ......... 425/505, 521, 501, 122, 425/237, 404, 115, 114, 130, 329, 335, 363, 380, 381; 264/136, 134, 137; 156/166

[56] References Cited
UNITED STATES PATENTS

| | | | |
|---|---|---|---|
| 1,980,694 | 11/1934 | Nisbett | 425/115 X |
| 2,140,213 | 12/1938 | Tegarty | 425/363 X |
| 2,874,411 | 2/1959 | Berquist | 425/114 |
| 2,958,909 | 11/1960 | Bradley et al. | 425/363 X |
| 3,303,251 | 2/1967 | Heider et al. | 425/114 X |
| 3,470,051 | 9/1969 | Meyer | 425/404 X |
| 3,470,286 | 9/1969 | Weber | 425/501 X |
| 3,538,548 | 11/1970 | Tenner | 425/381 |

Primary Examiner—J. Howard Flint, Jr.
Attorney, Agent, or Firm—Larson, Taylor, and Hinds

[57] ABSTRACT

An apparatus for continuously producing tapered shafts comprises peripherally co-operating rotating rolls. At least one of the rolls has a peripheral groove of varying depth so that as the rolls are rotated they define, at their co-operating regions, a die aperture of cyclically varying cross-section. Resin-impregnated fibres e.g. carbon fibres, are drawn through the die aperture to form a series of shafts each corresponding to one revolution of the rolls. A reciprocating mandrel may also be present if it is desired to produce hollow articles. According to one mode of operation, the rolls and, if present, the mandrel, are locked in position and the resin-impregnated fibres are pulled through the stationary die aperture to form an article the predetermined constant cross-section of which depends on the position at which the rolls and, if present, the mandrel have been locked. Heaters are provided to solidify the resin downstream of the die aperture. The possibility of making shapes other than tapered or uniform cross-sectional shapes is discussed.

15 Claims, 4 Drawing Figures

FIBRE REINFORCED COMPOSITES

This invention relates to fibre reinforced composites.

In particular the invention is applicable to the production of elongate composite articles of non-uniform section such as tapered tubes e.g. for use as golf-club shafts. Previously the fabrication of such forms has been restricted to essentially batch processes on account of the tapered form of the shaft and U.K. patent specification No. 1,327,246 (National Research Development Corporation) describes one such process.

According to the broadest aspect of the present invention, an apparatus for use in the continuous production of elongate articles of fibre reinforced composite material comprises a forming die of variable aperture and means for controlling this aperture in relation to the linear displacement of the composite material through the die cavity to produce an elongate article of predetermined varying external cross-section.

Conveniently, the apparatus comprises two circumferentially co-operating rolls, the cylindrical surfaces of which define a die cavity the cross-sectional shape of which varies cyclically when, in operation of the apparatus, the two rolls are synchronously rotated in opposite rotational senses.

One or both of the cylindrical surfaces may for example include a peripheral groove the depth of which varies along the length of the groove and according to a preferred feature both rolls have such a groove and the cavity presented by the rolls as they rotate is symmetrical about an imaginary plane which contains the longitudinal axis of the die cavity and which is perpendicular to an imaginary plane containing the axes of rotation of the two rolls.

The or each groove may include one or more step portions in which case the depth of the groove(s) increases from a minimum value at the radially outer part of the step portion(s) to a maximum value at the radially inner part of the step portion(s). The depth of the groove(s) may increase at a constant rate between the two values.

The apparatus may also include a mandrel adapted for location along the axis of the die cavity. Conveniently the cross-section of the mandrel will vary in the same way as the cross-section of the die cavity whereby an elongate form of substantially constant wall thickness is produced in operation of the apparatus. Means may also be provided for automatically reciprocating the mandrel along the axis of the die cavity so that the mandrel moves synchronously with the groove-defining surfaces of the rolls up to a certain point and then returns relatively rapidly, in a contrary direction, to some initial position, prior to subsequent movement in synchronism with said groove-defining surfaces. The motion of the mandrel may be controlled by suitable gearing or by a cam, for example.

According to another feature of the invention a distributor plate is provided upstream of the die cavity for distributing fibres for introduction into the cavity. The distributor plate may also include means for distributing a shear reinforcement tape e.g. of aluminium foil.

The invention also includes the case where a resin bath is provided upstream of the die cavity for impregnating the fibres and, if present, the shear reinforcement tape. The impregnated fibres are brought together in the die cavity as hereinafter described to form the finished article, and means for solidifying this article in the vicinity of the downstream side of the die cavity are preferably also provided.

The invention also includes an apparatus for forming an elongate article of composite material and axially varying external cross-section made with the apparatus of the present invention. One such article e.g. for use as a golf club shaft, has a uniform taper from one end to the other. The invention also includes a golf club incorporating such a shaft.

In a preferred embodiment, the shaft includes a longitudinal unidirectional layer (or layers) of a high performance fibrous composite in combination with other different types of layers. Typically, this unidirectional layer provides the principal flexural strength and stiffness, and the other layer(s) provide the method of shear transmission arising from, for example, bending or torsion. The high performance composite is preferably of the type in which strong, stiff, low density fibres (such as the carbon fibres described in British Pat. No. 1,110,791, boron fibres, Kevlar 49 (Du Pont) and others types) are combined in a controlled manner with a suitable polymer system. A suitable polymer system would be capable of liquid stage impregnation of a fibrous mass and subsequent solidification by thermal/-chemical means. Although thermosetting systems such as polyesters e.g. crystic 212 and catalyst paste B(Scott-Bader) and epoxies (e.g. Shell epicote 190/epicure DX 126, epicure K61B) are ideally suited, the possibility of other polymer types such as thermoplastics (e.g. polyimide), is not excluded for this purpose.

FIG. 1a is a side elevational view of a system for producing a hollow tube, in accordance with a preferred embodiment of the invention;

FIG. 1b is a front elevation view, to an enlarged scale, of the distributor plate shown in FIG. 1a;

Figure 1:
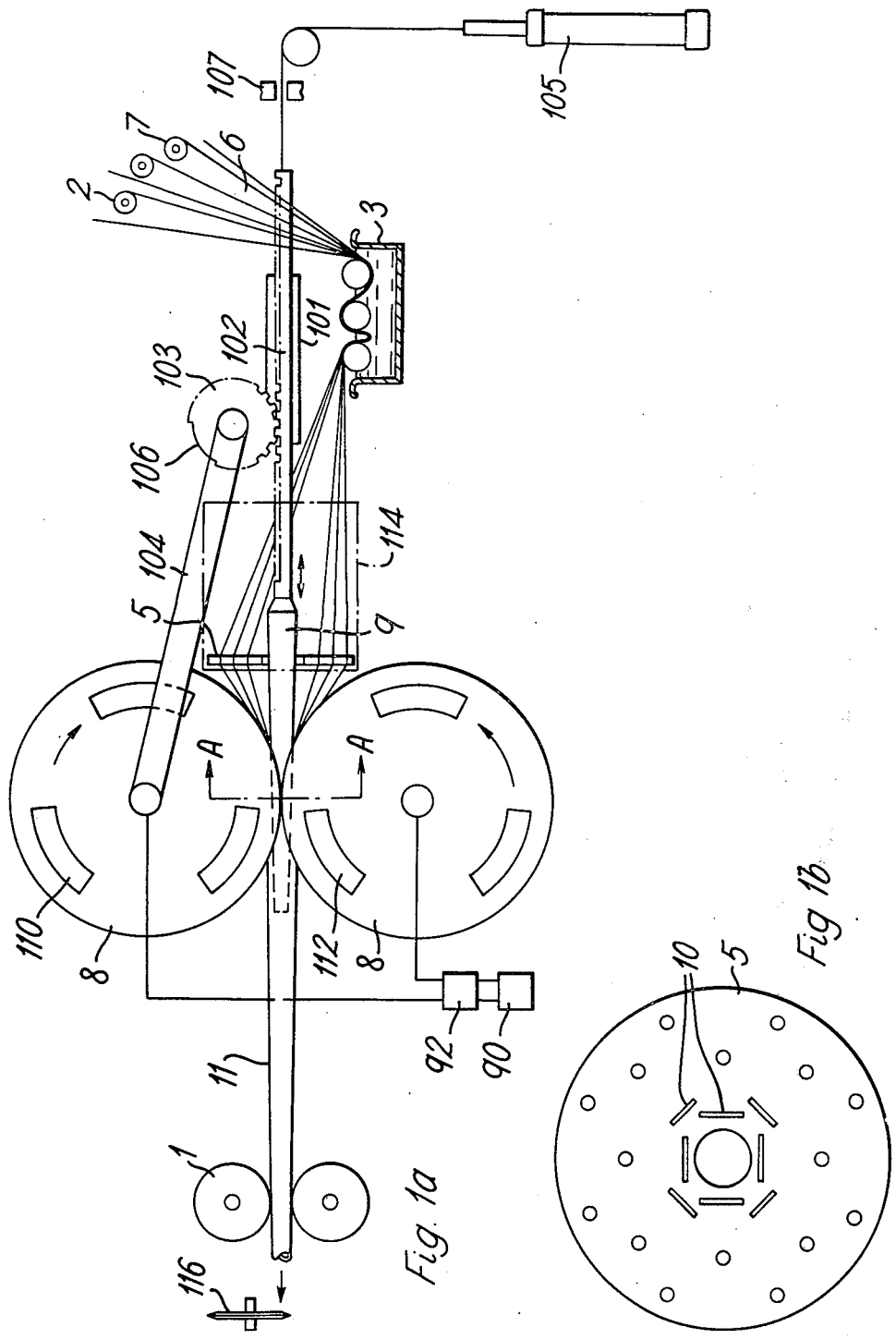
Figure 2:
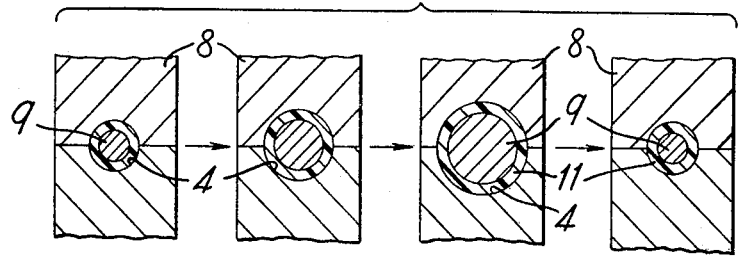
FIG. 2 is a cross-sectional view, to an enlarged scale, taken generally along line A—A of FIG. 1a illustrating the cyclic variation in the effective die aperture.

The invention may be better understood by reference to the particular example shown in the FIGS. 1a, 1b, and 2 of the accompanying drawings, which show a system for producing a tapered hollow tube such as would be required for a golf-club shaft for example. In this particular example, the shear reinforcement means cmprises metal foils (e.g. aluminium alloy) which are simultaneously formed with the fibre/resin into a composite article. The method is illustrated in FIG. 1a. The driving means for this method is a set of flexible rolls 1, actinig under controlled pressure. Continuous carbon fibres (such Grooved ground steel rolls 8 are driven at a controlled rate by a synchronous electric motor 90 and a variable speed drive 92. In the example under consideration the peripheral speed of the rolls is greater than the linear speed of the mandrel and equal to the linear speed of the fibres. The rolls generate the taper of a golf club shaft in their plane of contact during one revolution, which defines the die surface and provides a variable aperture therebetween with provision for the cyclic discontinuity between consecutive shafts. Mandrel 9 moves into this defined aperture at a controlled rate which defines the internal diameter of the tube.

This controlled movement of the mandrel may be achieved by various mechanical, hydraulic and electromotive means, e.g., as in the particular case illustrated, an extension rack 102 supported in a guide 101. The pinion wheel 103 for rack 102 is driven by chain drive 104 from the upper one of the rolls 8. As upper roll 8 rotates it drives pinion wheel 103 via a chain and sprocket connection 104 to move the rack 102 (and with it the mandrel 9) to the left (as viewed in FIG. 1a). The diameters of the pinion wheel 103 is such as to correctly relate the axial velocity of the mandrel to the rotational speed of the rolls to give the desired wall thickness to the tapered article being produced. When the mandrel has reached the end of its leftwards travel, (corresponding to the arrival of the deepest part of the roll grooves at the die aperture), a smooth section 106 of the pinion wheel lacking the teeth of the rest of the wheel frees the rack 102 from the wheel and allows it to move to the right, under the influence of a pneumatically or hydraulically operated return cylinder 105, until the end of rack 102 engages with a stop 107. The pinion wheel resumes its drive on the rack when the shallower ends of the roll grooves arrive at plane A—A to define the cavity for the tapered end of the next shaft.

In one practical example for making 40 inch tapered shafts, the peripheral speed of the rolls is 10 inches per minute (corresponding to an angular speed of $\pi/2$ radians per minute) and the mandrel speed is 2.5 inches per minute. The resulting cyclic variations in effective die aperture are evident from FIG. 2 which shows on an enlarged scale a cross-section taken on A—A of FIG. 1a after successive intervals of time.

The rolls 8 are heated by built in electric heating elements illustrated diagrammatically at 110 and 112 respectively. In addition a radiant heat oven 114 heats the mandrel and also provides a preheat zone extending over some 10–15 inches before the entrance to die cavity 4. In operation these various heaters raise the composite to a temperature which, for the particular resin system and drawing rate, is sufficient to effect a rapid solidification in the vicinity of the downstream side of the die cavity. If desired the emergent composite article 11 may be wrapped with a heat-shrinkable film of cellophane to provide a bonding pressure during post cure. A cut-off device in the form of a circular saw 116 is provided beyond the drive roll, and the shafts are then post-cured.

The linear speed of drawing and the resin gelation time must be carefully matched to ensure proper formation of the shaft. For this reason hot setting polyester formulations with a benzoyl peroxide catalyst are suitable. In the present example, the resin is crystic 212, the catalyst is paste B, and the rolls, mandrel, and preheat zone are heated to 140°C. The resin setting time is 1 minute and the rate of shaft production is 10 inches/minute.

It should be borne in mind that resin setting time is a function of temperature. With the materials quoted above, for example, the resin setting time rises to 2 minutes if the roll/mandrel/preheat zone temperature is dropped to 115°C.

It should be clearly understood that this method is not restricted to any particular fibre or resin type, shear reinforcing means, or geometry. For example, an effective shear stiffening means could be incorporated by the angular winding, from rotating spools, of a fibrous material on to mandrel 9 prior to drawing into the forming cavity. Alternatively, the reciprocating mandrel 9 may be replaced by preformed cores, connected in series and continuously fed into the cavity at an appropriate rate. The provision of localised heating for curing purposes may also be achieved in alternative ways to contact conductors. Microwave heating would be particularly suitable.

Figure 3:
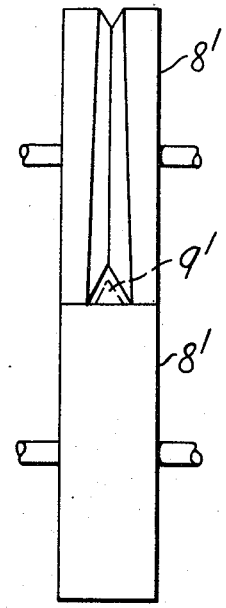
FIG. 3 is an end elevational view of rolls used in producing a rod of tapering triangular cross-section.

FIG. 3 shows an end on view of the rolls 8' for producing a rod of tapering triangular cross-section in which only one of the rolls has a peripheral groove. If desired a triangular sectioned mandrel may also be provided (at position 9' in which case the remainder of the apparatus, apart from the repositioning of the mandrel to co-operate with the single groove, will be identical to that shown in FIG. 1a.

Finally, in addition to the suitability of the techniques above described for the production of variable section elongate forms, it is clear that they may also be used for articles of constant section, with one set of rolls providing the tooling for a wide range of article dimensions. Thus in accordance with another aspect a mechanical brake applied to the upper roll 8 locks the rolls at some preselected orientation to define a die cavity of the desired cross-sectional area and elongate articles of fibre reinforced composite material are formed by pulling through fibres impregnated with bonding material, e.g. using the remainder of the apparatus described with reference, where appropriate, to the accompanying drawing. if a mandrel is used in this "stationary-roll" mode of operation, then obviously this too will be maintained stationary relative to the die cavity to produce an article of constant wall thickness. If a tapered mandrel is used (such as that illustrated in the drawing) then the axial position of this is chosen to give the required wall thickness to the resulting article 11. To adjust the apparatus for production of an article of different external dimensions it is sufficient to reset the rolls at the orientations associated with the new size of die cavity required. If a tube is being made, the bore of the tube being produced can easily be reset to some new value by adjusting the axial position of the tapered mandrel.

It will also be understood that the die cavity need not necessarily be of circular cross-section and any other desired cross-sectional shape (e.g. square, hexagonal, oval, triangular etc.) could equally well be provided. Nor need carbon fibres necessarily be used for the longitudinal reinforcement although they may often be preferred on account of their high strength/weight ratio. In some applications other fibres, such as glass fibres or polypropylene fibres, might be used instead of carbon fibres.

I claim:

1. An apparatus for use in the continuous production of elongate articles of fibre reinforced composite material comprises a forming die of variable aperture, means for controlling this aperture in relation to the linear displacement of the composite material through the die cavity to produce an elongate article of predetermined varying external cross section, and means for providing continuous reinforcement fibres extending throughout the length of the article.

2. An apparatus as claimed in claim 1 including two circumferentially co-operating rolls the cylindrical surfaces of which define a die cavity the cross-sectional shape of which varies cyclically when, in operation of the apparatus, the two rolls are synchronously rotated in opposite rotational senses.

3. An apparatus as claimed in claim 2 in which at least one of the cylindrical surfaces includes a peripheral groove the depth of which varies along the length of the groove.

4. An apparatus as claimed in claim 3 in which both cylindrical surfaces include a groove the depth of which varies along the length of the groove and the cavity presented by the rolls as they rotate is symmetrical about an imaginary plane which contains the longitudinal axis of the die cavity and which is perpendicular to an imaginary plane containing the axes of rotation of the two rolls.

5. An apparatus as claimed in claim 4 in which the at least one said groove includes at least one step portion so that the depth of the groove increases from a minimum value at the radially outer part of the step portion to a maximum value at the radially inner part of the step portion.

6. An apparatus as claimed in claim 5 in which the depth of the groove increases at a constant rate between the two values.

7. An apparatus as claimed in claim 1 including a mandrel for location along the axis of the die cavity.

8. An apparatus as claimed in claim 7 in which the cross-section of the mandrel varies in the same way as the cross-section of the die cavity whereby an elongate form of substantially constant wall thickness is produced in operation of the apparatus.

9. An apparatus as claimed in claim 7 including means for automatically reciprocating the mandrel axially of the die cavity so that the mandrel moves synchronously with the groove-defining surfaces of the rolls up to a certain point and then returns relatively rapidly, in a contrary direction, to some initial position, prior to subsequent movement in synchronism with said groove-defining surfaces.

10. An apparatus as claimed in claim 1 including a distributor plate provided upstream of the die cavity for distributing fibres for introduction into the cavity.

11. An apparatus as claimed in claim 10 in which the distributor plate includes means for distributing a shear reinforcement tape.

12. An apparatus as claimed in claim 1 including a resin bath provided upstream of the die cavity for impregnating the fibres.

13. An apparatus as claimed in claim 12 including heating means to assist solidification of the resin downstream of the die cavity.

14. An apparatus as claimed in claim 13 including heaters for the two rolls, the mandrel, and a preheat zone upstream of the die cavity.

15. An apparatus as claimed in claim 7 including means for holding the rolls and the mandrel, in a predetermined position.

* * * * *

UNITED STATES PATENT OFFICE
CERTIFICATE OF CORRECTION

PATENT NO. : 3,945,783
DATED : March 23, 1976
INVENTOR(S) : William Paton

It is certified that error appears in the above-identified patent and that said Letters Patent are hereby corrected as shown below:

Column 2, line 48, "cmprise" should read --comprise--

Column 2, line 52, "actinig" should read --acting--

Column 2, line 53, after "such" insert --as Courtaulds Grafil A or Morganite Modmor Type III are drawn from spools (2), through an impregnation bath (3) (containing a polyester resin) and into the forming cavity (4) via a distributor plate (5). Simultaneously, aluminium alloy foils (6) degreased and prepared for bonding by etching in an acid solution such as a conventional sulphuric/chromic acid mix are drawn from their spools (7) and into the forming cavity (4) via the special apertures (10) in the distributor plate. This plate (5) is shown again in Figure 1(b) on an enlarged scale.)--

Column 3, line 7, "diameters" should read --diameter--

Column 4, line 9, after "9'" insert --)--

Column 4, line 26, "if" should read --If--

Signed and Sealed this

Fourteenth Day of September 1976

[SEAL]

Attest:

RUTH C. MASON
*Attesting Officer*

C. MARSHALL DANN
*Commissioner of Patents and Trademarks*